United States Patent [19]
Fain et al.

[11] Patent Number: 5,340,515
[45] Date of Patent: Aug. 23, 1994

[54] POLYCRYSTALLINE γ-LITHIUM ALUMINATE FIBERS AND PROCESS OF MANUFACTURE

[75] Inventors: Charles C. Fain, Seneca, S.C.; Gregory M. Lowe, Tonawanda, N.Y.; Teresita N. C. Frianeza-Kullberg, Gastonia; Daniel P. McDonald, Belmont, both of N.C.

[73] Assignee: FMC Corporation, Philadelphia, Pa.

[21] Appl. No.: 927,756

[22] Filed: Aug. 10, 1992

[51] Int. Cl.$^5$ .............................................. C04B 35/44
[52] U.S. Cl. .............................. 264/63; 264/DIG. 19; 501/95
[58] Field of Search .......................... 264/63, DIG. 19; 501/95

[56] References Cited

U.S. PATENT DOCUMENTS

| | | | |
|---|---|---|---|
| 4,559,191 | 12/1985 | Arons | 264/DIG. 19 |
| 4,798,815 | 1/1989 | Fain | 264/DIG. 19 |
| 4,820,664 | 4/1989 | Fain | 501/95 |
| 4,970,123 | 11/1990 | Witzke | 264/29.2 |
| 5,188,776 | 2/1993 | Witzke | 264/29.2 |

FOREIGN PATENT DOCUMENTS 63-260812 10/1988 Japan.
WO90/0859 5/1990 PCT Int'l Appl.

OTHER PUBLICATIONS

Watanabe Arira, Crystal Growth of Rod-Shaped β-LiAlO$_2$ In J. Am. Ceram. Soc., C-268-269 (1987).

Primary Examiner—James Derrington
Attorney, Agent, or Firm—Charles C. Fellows; Robert L. Andersen

[57] ABSTRACT

A method for preparing polycrystalline lithium metal oxide fibers of the formula Li$_x$M$_y$O$_z$ by filling micromold fibers of a desired inner diameter and length with a mixture composed of the desired metal salts or solutions of salts or alkoxides, solvents, binders, plasticizers, and deflocculants, firing the filled micromold fibers at elevated temperatures but below temperatures of lithium oxide volatilization in air for at least one hour to simultaneously burn-out the micromold and yield the polycrystalline lithium metal oxide fiber.

9 Claims, 5 Drawing Sheets

POLYCRYSTALLINE γ-LITHIUM ALUMINATE FIBERS AND PROCESS OF MANUFACTURE

This invention describes polycrystalline lithium metal oxide ceramic fibers of the formula $Li_xM_yO_z$, where M is aluminum, silicon, or a transition metal with atomic numbers ranging from 22–31 and 40–52 and methods for their manufacture.

BACKGROUND OF THE INVENTION

Ceramic fibers are recognized as having utility in a variety of industrial composites. Composite materials are desired combinations of two or more constituent materials to form a bonded structure that has mechanical, physical and chemical advantages over each individual constituent. In particular, ceramic matrix composites contain a matrix component that may be a ceramic oxide and a reinforcing material like a ceramic fiber. Some of the various applications of these composites are cutting tools, armor, engine parts, electronic devices, catalysts, and medical implants.

Electrolyte tiles in molten carbonate fuel cell prepared from gamma lithium aluminate powder and lithium carbonate/potassium carbonate electrolyte could be improved by incorporating suitable reinforcing fibers in the tiles. A typical tile is about 1 m$^2$ in area and from 0.5–2 mm in thickness. Reduction in tile thickness is desirable in order to reduce electrical resistance. This can be achieved by the addition of reinforcement fibers to increase the strength and durability of the tile structure and the overall lifetime of the cell. Such reinforcing fibers must not only have high strength but the fibers must also be compatible with the matrix material, and be thermally stable at temperatures up to at least 650° C. under the molten carbonate fuel cell environment. Alumina fibers have been tested but formation of lithium aluminate occurred. Ideally, lithium aluminate fibers are the best choice for the molten carbonate fuel cell electrolyte tile. Other applications may potentially require other lithium aluminum oxide fibers such as lithium pentaaluminate, lithium dialuminate, or other lithium metal oxide fibers.

Methods developed for the production of ceramic fibers include spinning, colloidal evaporation, vapor deposition, and drawing from a melt. Non-oxide fibers like silicon carbide fibers have been prepared by these processes but limitations have been observed when applied to compositions containing glass-forming oxides. An example is the production of ceramic refractory fibers like alumina-silica, alumina, and zirconia by a blowing method wherein a stream of the molten material is subjected to a jet of air or steam. The disadvantages of this method are the requirement for a huge capital investment in specialized plant machinery and the phase separation that may occur from rapidly cooling the drawn fiber to prevent devitrification or crystallization. In the solution spinning process currently used for the production of alumina fibers, control over the form of the fibers, such as fiber diameter, is done by spinning the alumina fibers at low temperature from a melt of pure raw materials containing not more than 60–65% alumina followed by heat treatment above 1000° C.

The synthesis of polycrystalline lithium metal oxide fibers such as lithium aluminate fibers has been investigated but only a few successful processes have been reported. One of the major difficulties in the preparation of lithium aluminate fibers by drawing from a melt is the loss of lithium oxide due to evolution at elevated temperatures. Therefore, a lower temperature or shorter time would be more desirable for the synthesis of lithium aluminate fibers, conditions which do not generally lead to proper densification or proper phase of the lithium aluminate.

Watanabe and his co-workers disclosed in Japanese patent application 63-260812 a method for the preparation of long, rod-shaped β-LiAlO$_2$ crystals in the Journal of the American Ceramic Society, Vol. 70:10, C-268-269 (1987). Raw materials were LiOH.H$_2$O:γ-Al$_2$O$_3$:NaOH in mole ratios of 4:1:4. Columnar test pieces were shaped from these mixed powders under 9.8 MPa pressure, fired at 600° C. for three hours, cooled, and dipped into water for 24 hours to yield rod-shaped β-LiAlO$_2$ crystals that were 1.5 μm in diameter and 10 to 15 μm long. Examples cited showed the fiber properties of these crystals obtainable under various powder compositions and calcination conditions. The problems with this approach include the potential conversion of β-LiAlO$_2$ to other phases in the fuel cell. The small size of the crystal also limits its value as a reinforcement.

In International Patent Application WO 90/04859, Smith and Kucera disclosed a method of preparing ceramic oxide fibers by spraying a slurry of the ceramic material perpendicularly into an ambient stream of air or other gas and then heating the resultant green fibers to remove the binders. Examples cited were lithium ferrite and lithium manganite fibers which are potential electrode materials in molten carbonate fuel cells. Application of this technology to the production of lithium aluminate fibers and subsequent benefits were demonstrated by P. M. Brown in the "Physical Property Optimization of Lithium Aluminates for Fabrication of Molten Carbonate Fuel Cell Matrices" which was presented at the 1990 Fuel Cell Seminar. The resultant molten carbonate fuel cell electrolyte tiles produced with inclusion of the fibers increased the tile strength. The need exists for improved fibers to yield further improvements in the electrolyte tile strength or in other applications.

Charles C. Fain in U.S. Pat. Nos. 4,798,815 and 4,820,664 disclosed the piggyback method of making ceramic fibers by wetting special carbon fiber micromolds, which are non-ceramic fibers having elongated cavities, with a wet chemical precursor and subsequently heating the wetted micromolds to produce ceramic fibers of various compositions. Although the 'piggyback' method of producing polycrystalline oxide fibers is generally useful for producing otherwise difficult to produce fibers, U.S. Pat. Nos. 4,798,815 and 4,820,664 do not disclose the processing times, temperatures, procedures, or carrier media necessary for preparation of high quality dense lithium metal oxide fibers without loss of lithium through lithium oxide evolution which occurs at temperatures higher than 1000° C.

SUMMARY OF THE INVENTION

The present invention provides polycrystalline lithium metal oxide ceramic fibers of the formula $Li_xM_yO_z$ where M is aluminum, silicon or a metal with atomic numbers from 22–31, 40–52, and 72–84 and with the desired length and diameter and a method of preparing such fibers comprising:

1.) preparing a particulate oxide suspension composed of lithium metal oxide powder or the corresponding metal salts of the product oxide fiber, binders, deflocculating agents and other solvents needed to attain the proper viscosity and slurry characteristics;

2.) this oxide suspension is filled into elongated, non-ceramic, fiber micromolds such as hollow or C-shaped carbon fibers by capillary action, ultrasonic packing, or other similar manner of filling the carbon fiber micromold;

3.) heating the filled micromold in a graphite cylinder containing lithium hydroxide or lithium oxide powder and firing under inert atmosphere at temperatures higher than 1000° C. or close to the melting point of the product oxide fiber for at least five minutes whereby the lower melting lithium hydroxide vaporization effectively saturates the vapor phase with lithium oxide inhibiting evolution of lithium oxide from the lithium metal oxide in the micromold and followed by firing in air at 500°–1000° C. to burn-off the micromold or 4.) the ceramic fiber containing micromold is fired in air at 500°–1000° C. to simultaneously burn off the fiber micromold and yield the polycrystalline lithium metal oxide fibers. The polycrystalline fibers can also be separated from the micromold mechanically by using a separating agent or employing a shaking technique together with an abrasive agent or instrumentally.

Figure 1:
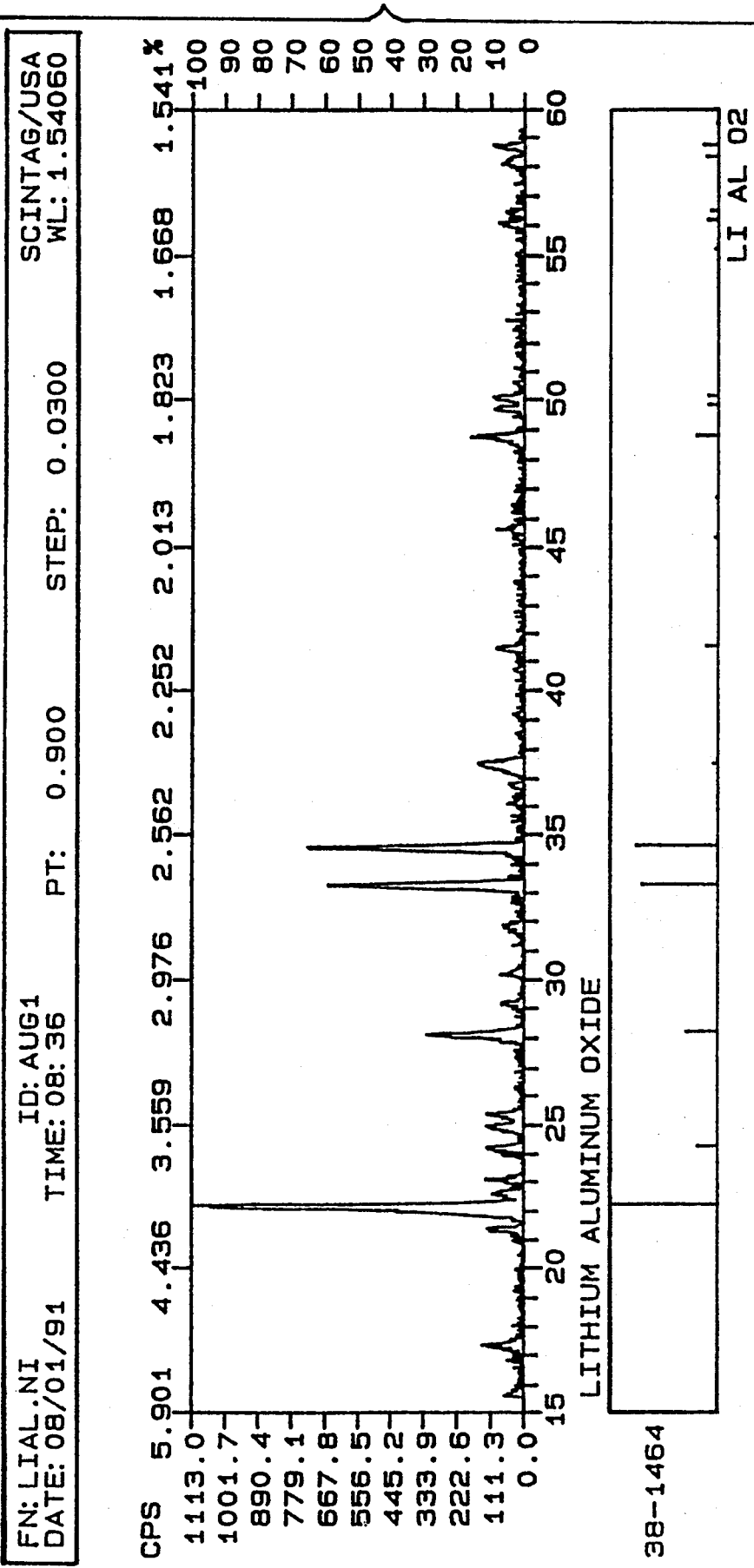
FIG. 1 describes an analysis for phase identification by x-ray powder diffraction.

The $\gamma$-LiAlO$_2$ fibers of the present invention are thus prepared by a modification of the piggyback process developed by co-inventor C. C. Fain. In the present process, piggyback micromolds such as hollow or C-shaped carbon fibers, melt spun from the mesophase pitch, are used. The desired feed composition containing a mixture of metal salts, solvents, and optionally, binders, plasticizers and deflocculants, is introduced into the micromolds, followed by heating the filled micromolds in air to form the fiber while volatilizing the micromold or, optionally, the micromolds are filled and heated in an inert environment to a temperature sufficient to sinter the filling material followed by heating the molded fiber in air to volatilize the micromolds and yield polycrystalline lithium metal oxide fibers without volatilization of the lithium oxide. The dual ceramic/non-ceramic fiber is then heated in an oxygen-containing environment to burn away the carbon.

Micromolds useful in the practice of this invention include but are not limited to hollow or C-shaped carbon fibers having at least 5 microns inner diameter and are at most 2 cm long.

The micromolds can have an inner diameter of at least 10 microns. The resulting polycrystalline lithium aluminate fibers can have a diameter of at least 5 microns and a length of 100 microns.

Metal salts useful in the practice of this invention include but are not limited to hydroxides, oxides, carbonates, nitrates, or alkoxides of lithium and the corresponding metal, M. These metal salts are employed in mixtures in the amounts equivalent to desired molar ratios of the Li$_x$M$_y$O$_z$. The oxidation states of M and desired molar ratios fix the formulation values of x, y, and z.

Solvents useful in the practice of this invention include but are not limited to water, alcohol, trichloroethylene.

Binders useful in the practice of this invention include but are not limited to polyvinylbutyrol resin (Butvar B 98) and Metoramic 73171.

Plasticizers useful in the practice of this invention include but are not limited to butylbenzylphthalate (Santicizer 160).

Deflocculants useful in the practice of this invention include but are not limited to Fish oil or Darvan 821 A.

The desired ceramic slurries containing the ceramic material with a mixture of metal salts, solvents, binders, plasticizers and deflocculants are prepared by mixing together the selected materials under conditions to produce a dispersion or suspension of fine particles in a liquid. The term slurry as used herein includes both suspensions and dispersions of particulate matter on the order of a micron ($10^{-3}$ mm.) to one millimicron ($10^{-6}$ mm.) dispersed or suspended in a liquid.

The micromolds are filled with the ceramic slurry by any suitable means such as capillary action, ultrasonic packing, submersing the micromolds in the ceramic slurry and allowing the slurry to fill the micromolds which can be simply separated from the liquid slurry by filtering through a screen or such other separation means as may be convenient.

The micromolds, filled with the fiber precursor ceramic slurry, are then heated in a non-oxidizing atmosphere in a suitable heating device such as a graphite lined furnace. When making fibers from which lithium oxide might evolve, lithium hydroxide or lithium oxide powder is placed in the oven and heated along with the micromolds to provide an atmosphere saturated with lithium oxide thus preventing the evolution of lithium oxide from filled micromolds during the fiber forming step. The filled micromolds are heated (fired) at temperatures between 1000° C. and just below the melting point of the metal oxide fiber being formed for at least five (5) minutes but typically ten minutes to 30 minutes. Although further heating can be done, it is generally not necessary. The heating may initially be conducted at lower temperatures such as 100° C. to 150° C. to remove the slurry liquid from the outside of the micromolds. After the metal oxide ceramic fiber is formed the filled micromold is fired at 500° C. to 1000° C. in an oxidizing atmosphere, typically air, to burn off the fiber micromold.

The following examples further illustrate this invention.

EXAMPLE 1

Figure 2:
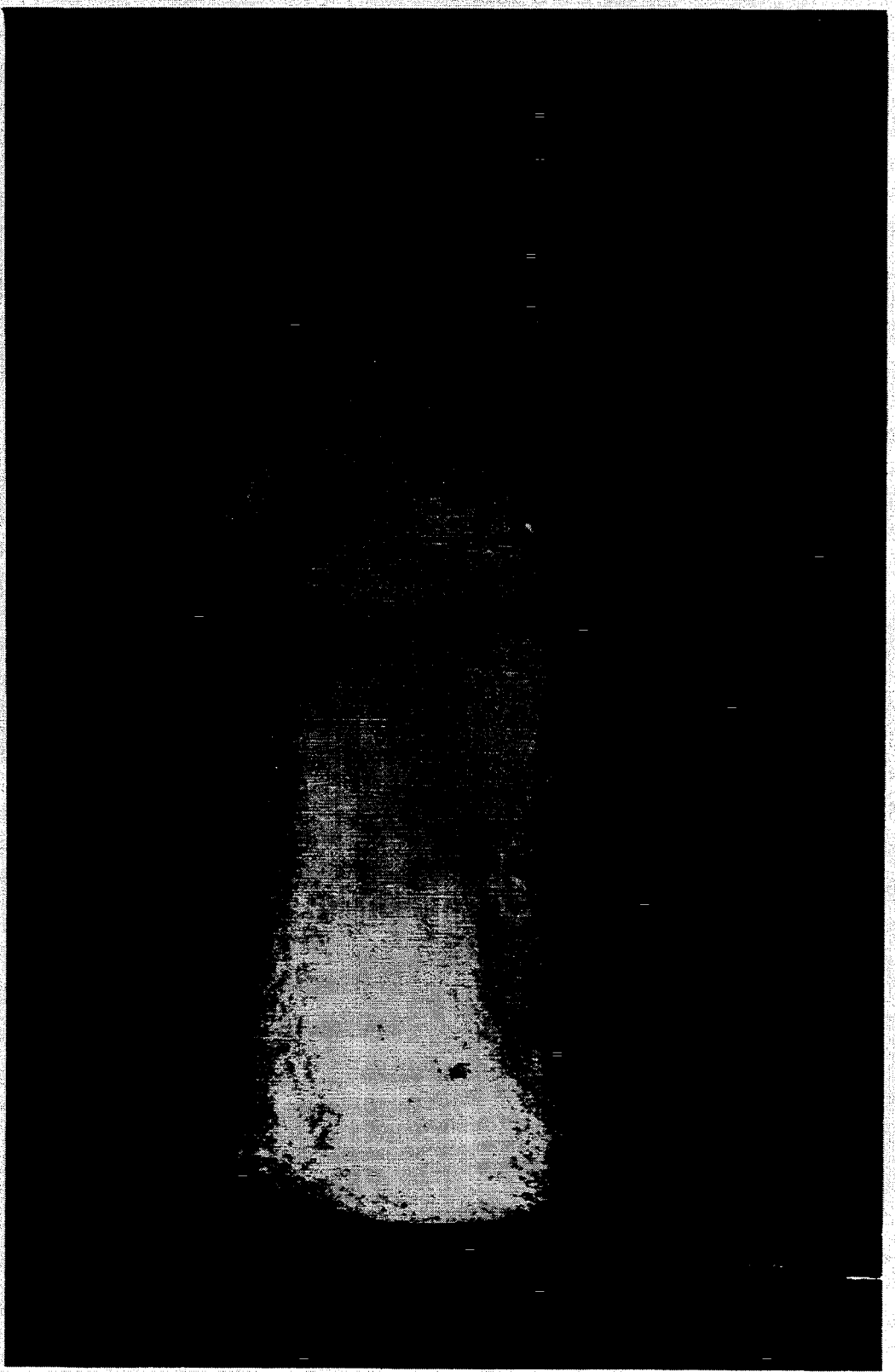
FIG. 2 is a photomicrograph showing fiber dimensions.
Figure 3A:
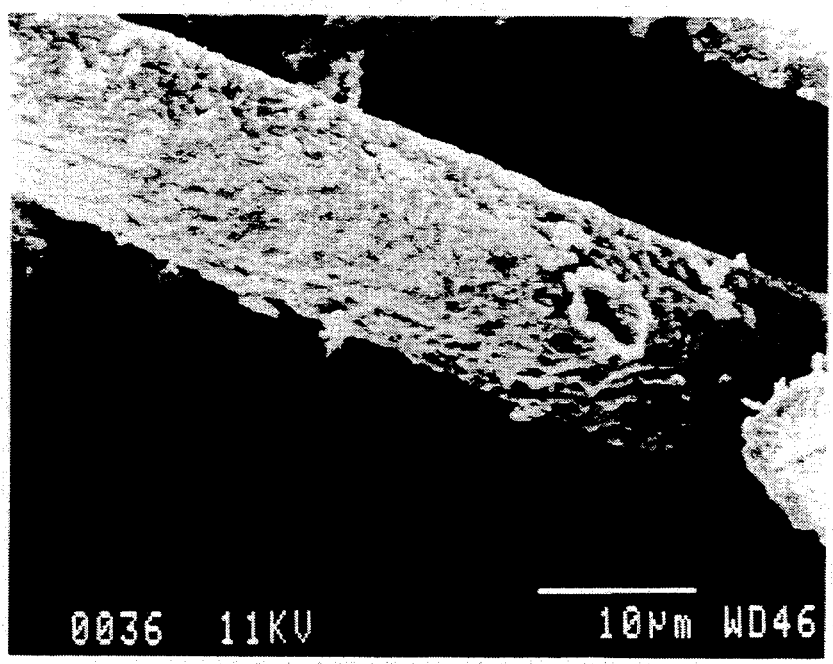
FIG. 3 is a photomicrograph showing fiber dimensions.
Figure 3B:
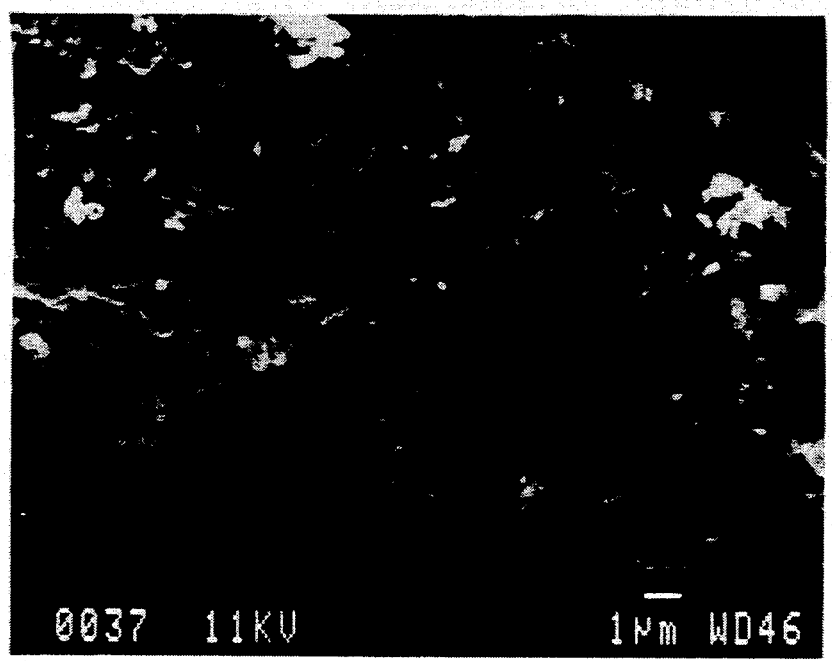

Thirty grams of $\gamma$-LiAlO$_2$ and forty milliliters of ethanol were mixed and ultrasonically deagglomerated. Hollow carbon fibers about 5 cm long and 20 $\mu$m inner diameter were added vertically into the mixture. The hollow carbon fibers were filled by capillary action with the $\gamma$-LiAlO$_2$ slurry. The dual component fibers were then dried initially in an oven at 100°–150° C., placed in a graphite cylinder containing a powdered mixture of graphite (3 g), lithium hydroxide monohydrate (1.5 g) and $\gamma$-LiAlO$_2$ (1.0 g), fired for 15 minutes at 1650° C. under inert atmosphere, and fired in air at 1000° C. for three hours. The resulting product was analyzed by x-ray powder diffraction for phase identification and by scanning electron microscopy for photomicrographs of fiber dimensions as shown in FIGS. 1–3. The fibers were purely γ-LiAlO$_2$.

EXAMPLE 2

Figure 4:
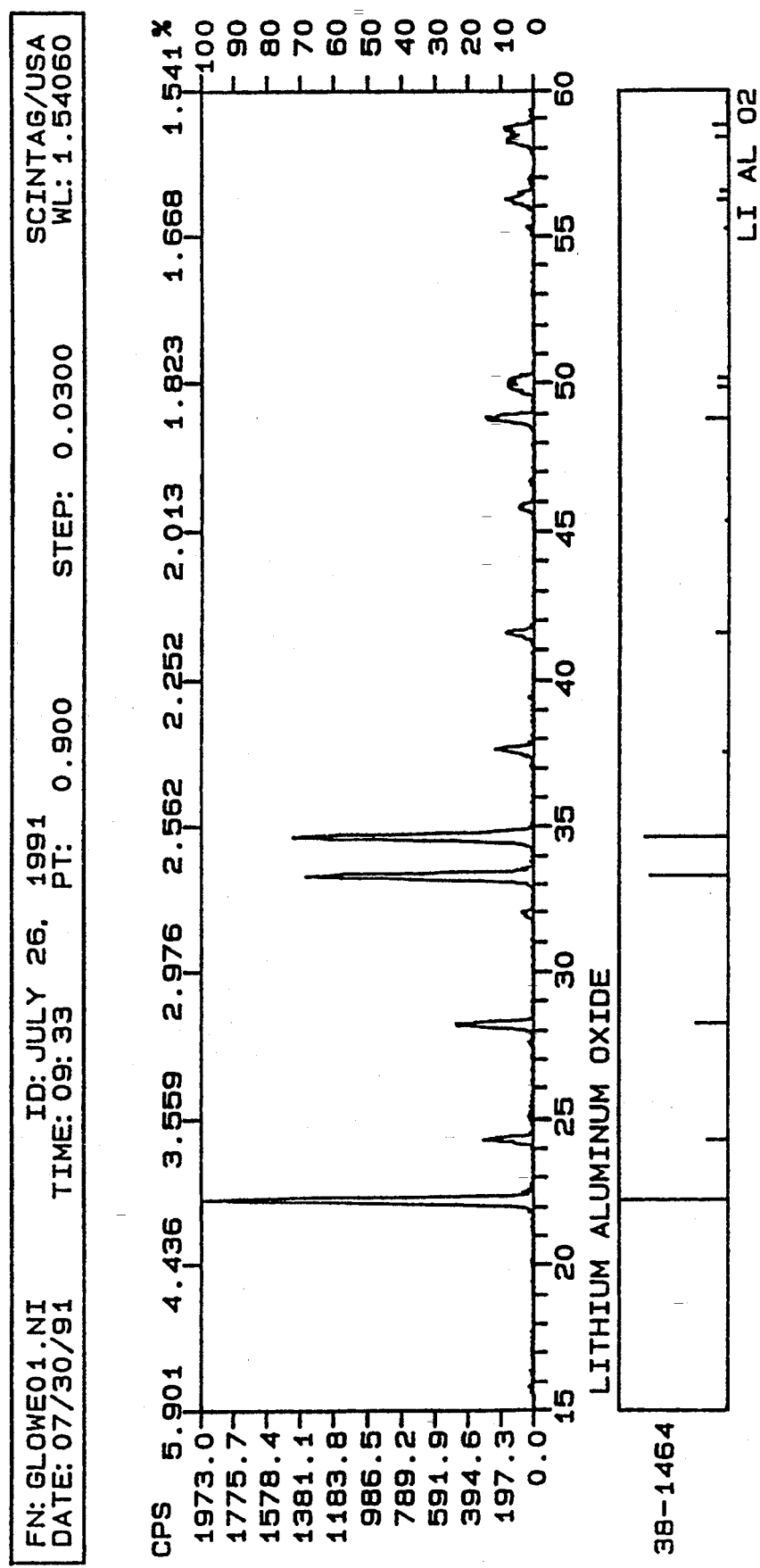
FIG. 4 describes an analysis for phase identification by x-ray powder diffraction.
Figure 5:
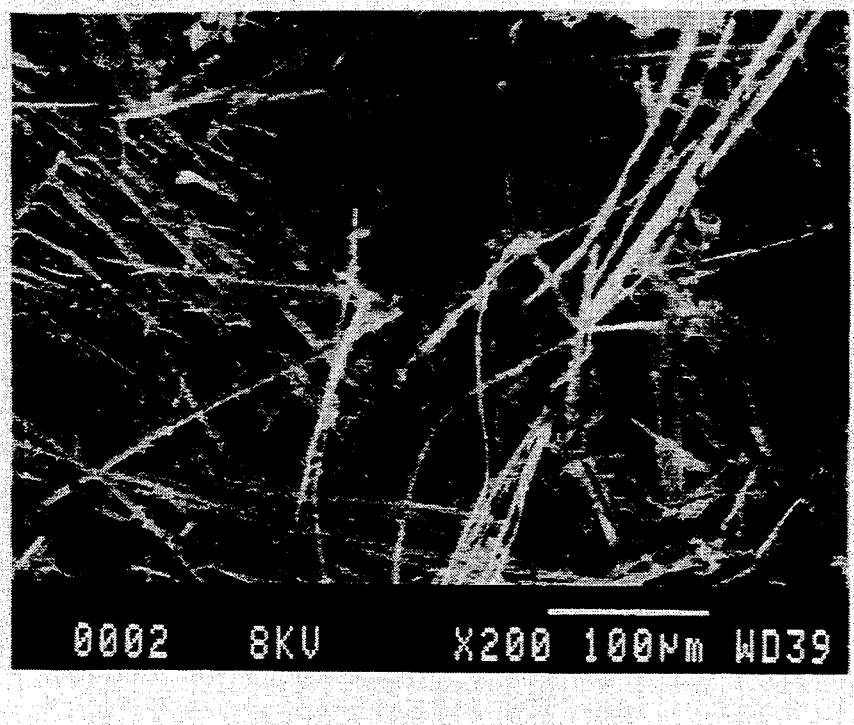
FIG. 5 is a photomicrograph showing fiber dimensions.

Sixty-four grams of Al(NO3)3.9H2O and 12 grams of lithium nitrate were mixed with one hundred milliliters of distilled water. Hollow carbon fibers as described in Example 7 were placed vertically in the mixture to allow filling of the fibers with the nitrate mixture by capillary action. The dual component fibers were washed with distilled water to remove excess precursor mixture on the outside and then initially dried in an oven at 100°–150° C. prior to firing at 1000° C. for at least three hours in air. The product fibers were evaluated by x-ray powder diffraction for phase identification and scanning electron microscopy for photomicrographs of powder dimensions as shown in FIGS. 4–5. The fibers were purely γ-LiAlO$_2$.

We claim:

1. A method for preparing polycrystalline γ-lithium aluminate fibers by filling micromold fibers having an inner diameter of at least five microns and a length up to 2 cm; with a dispersion of lithium and aluminum salts or lithium aluminate powder, having particle sizes of one millimicron to one micron, solvents, binders, plasticizers and deflocculants; placing the filled micromold fibers in a graphite cylinder containing lithium hydroxide or lithium oxide powder; first firing the filled micromold fibers at elevated temperatures above temperatures of lithium oxide volatilization for at least 5 minutes under an inert atmosphere followed by a second firing in air at temperatures from 500°–1000° C. for at least one hour to burn off the micromold and yield microcrystalline γ-lithium aluminate fibers.

2. The method of claim 1 wherein the lithium aluminate fiber is prepared from a lithium component selected from the group consisting lithium hydroxide lithium carbonate, lithium peroxide, lithium oxide, lithium alkoxides and lithium nitrate, and the aluminum component is selected from the group consisting of aluminum hydroxide, alumina, aluminum nitrate, and aluminum alkoxide.

3. The method of claim 1 wherein the first firing temperatures are at least 1000° C. and close to the melting point of the lithium metal oxide fiber.

4. The method of claim 1 wherein the first firing time is 20 minutes to one hour and under an inert atmosphere of nitrogen or argon.

5. The process of claim 1 wherein the solvent is selected from the group consisting of water, alcohol, trichlorethylene and mixtures thereof.

6. The method of claim 1 wherein the micromold fibers are filled by ultrasonification or by capillary action.

7. The method of claim 1 wherein the micromold fibers have an inner diameter of at least 10 microns.

8. The method of claim 1 wherein the resulting polycrystalline lithium aluminate fibers having a diameter of at least 5 microns and a length of 100 microns.

9. The method of claim 1 wherein the γ-lithium aluminate fibers are prepared from gamma lithium aluminate, alpha lithium aluminate or beta lithium aluminate powders and mixtures thereof.

* * * * *